(12) United States Patent
Hashimoto et al.

(10) Patent No.: US 7,985,461 B2
(45) Date of Patent: Jul. 26, 2011

(54) ADHESIVE CONNECTING MEMBER, OPTICAL CONNECTING STRUCTURE USED THEREWITH, AND JIG FOR ATTACHING ADHESIVE CONNECTING MEMBER

(75) Inventors: Nobuhiro Hashimoto, Shizuoka (JP); Masayoshi Suzuki, Shizuoka (JP); Tomoki Furue, Shizuoka (JP); Ken Sukegawa, Shizuoka (JP)

(73) Assignee: Tomoegawa Co., Ltd., Tokyo (JP)

( * ) Notice: Subject to any disclaimer, the term of this patent is extended or adjusted under 35 U.S.C. 154(b) by 753 days.

(21) Appl. No.: 11/979,168

(22) Filed: Oct. 31, 2007

(65) Prior Publication Data

US 2008/0099150 A1 May 1, 2008

(30) Foreign Application Priority Data

Oct. 31, 2006 (JP) ................................. 2006-295026
Mar. 7, 2007 (JP) ................................. 2007-057749

(51) Int. Cl.
*B32B 3/10* (2006.01)
*B29C 65/00* (2006.01)
*B65H 69/02* (2006.01)
*B31F 5/00* (2006.01)
*G03D 15/04* (2006.01)

(52) U.S. Cl. .................. 428/138; 156/304.2; 156/304.3; 156/158; 156/503; 156/505

(58) Field of Classification Search .................... 156/91, 156/92, 99, 106, 157, 158, 166, 230, 235, 156/239, 247, 297, 298, 299, 304.1, 304.2, 156/304.3, 307.1, 307.7, 423, 502, 503, 505, 156/538, 539, 540, 541, 543, 556, 559; 428/138; 269/287, 289 R, 303, 315

See application file for complete search history.

(56) References Cited

U.S. PATENT DOCUMENTS

| | | | |
|---|---|---|---|
| 3,989,338 A * | 11/1976 | Gosser | 439/43 |
| 4,512,630 A | 4/1985 | Runge | |
| 4,900,125 A | 2/1990 | Iyer | |
| 5,392,368 A * | 2/1995 | Schiltz | 385/14 |
| 6,254,282 B1 | 7/2001 | Ishihara et al. | |
| 2004/0228581 A1 | 11/2004 | Kaneko | |

FOREIGN PATENT DOCUMENTS

| | | |
|---|---|---|
| EP | 0 351 803 B1 | 1/1990 |
| EP | 1 039 318 A2 | 9/2000 |
| JP | 58-002512 A | 1/1983 |
| JP | 58 002812 A | 1/1983 |
| JP | 05-034532 A | 2/1993 |
| JP | 05 034532 A | 2/1993 |
| JP | 2000-080334 A | 3/2000 |
| JP | 2006-221031 | 8/2006 |
| JP | 2006 221031 A | 8/2006 |
| JP | 2007-093647 A | 4/2007 |
| JP | 2007 093647 A | 4/2007 |

* cited by examiner

*Primary Examiner* — Philip C Tucker
*Assistant Examiner* — Brian R Slawski
(74) *Attorney, Agent, or Firm* — Arent Fox LLP

(57) ABSTRACT

An adhesive connecting member and an optical connecting structure using the member, in which connection loss can be reduced and handling is facilitated, are provided. The adhesive connecting member optically connects an optical transmission medium and another optical transmission medium or an optical part by being intervened therebetween, and the member has a strongly adhesive face contacting the optical transmission medium and a weakly adhesive face contacting the other optical transmission medium or optical part. In addition, by this adhesive connecting member, the optical transmission medium and the other transmission medium or optical part can be optically connected.

6 Claims, 7 Drawing Sheets

ADHESIVE CONNECTING MEMBER, OPTICAL CONNECTING STRUCTURE USED THEREWITH, AND JIG FOR ATTACHING ADHESIVE CONNECTING MEMBER

TECHNICAL FIELD

The present invention relates to an adhesive connecting member, to an optical connecting structure using the member, and to a jig for attaching the adhesive connecting member.

BACKGROUND ART

Transmission efficiency of an optical transmission path using optical fiber is greatly affected by connection loss at an optically connected part, such as between plural optical fibers or between an optical fiber and another optical part such as optical semiconductor device. As a cause of the connection loss at these connecting parts, one concerning aligning of optical fibers, such as mismatched axes, an inclined axis, or a gap between the end surface of optical fibers may be mentioned, and one concerning an end surface of an optical fiber such as an inclined surface, surface roughness, or surface waving can be mentioned.

To eliminate these causes efficiently, there is a method in which a connecting device is made to have a complicated structure and high precision, and a method in which highly precise grinding is performed on an end surface of an optical fiber. However, there were problems of increased cost when connecting the optical fiber.

Furthermore, an optical connecting structure in which an adhesive connecting member is attached on a tip of an optical fiber and the optical fiber is connected to another optical fiber or an optical part via the adhesive connecting member to enable reduction of connection loss, which is a problem in optical communication, has been suggested (see Japanese Unexamined Patent Application Publication No. 2006-221031).

FIG. 8 is a side view showing a concept of an optical connecting structure in which a conventional adhesive connecting member is used. Reference numerals 10a and 10b correspond to optical fibers, and reference numeral 21 corresponds to a conventional sheet-shaped adhesive connecting member. In FIG. 8, the sheet-shaped adhesive connecting member 21 intervenes between the connecting end surfaces of the optical fibers 10a and 10b in a condition of adhering to both. The two optical fibers 10a and 10b face each other via the sheet-shaped adhesive connecting member 21, and they thereby optically connect the optical fibers.

However, in the method in which the above-mentioned conventional adhesive connecting member is used, it is difficult to reattempt connection if aligning and adhesion have failed once. Therefore, further improvement has been desired to facilitate handling. Furthermore, in this method, since it is necessary to cut the adhesive connecting member to a required size to attach onto the tip of the optical fiber while taking into consideration dust in the air, extremely careful handling is required, and in conditions outside a clean room, such as in conditions in the field, it is difficult to perform the connection of the optical fiber.

DISCLOSURE OF THE INVENTION

The present invention was completed in view of the above circumstances, and an object of the present invention is to provide the adhesive connecting member and the optical connecting structure using the member, in which connection loss can be reduced, aligning can be reattempted, and handling is facilitated. In addition, an object of the invention is to provide a jig for attaching the adhesive connecting member, in which the adhesive connecting member for reducing connection loss can be easily adhered onto the tip of optical fiber even in the field.

The present invention solves the above-mentioned problems by the following technical constructions.

The adhesive connecting member of the present invention optically connects an optical transmission medium or optical part (a) and another optical transmission medium or optical part (b) by being intervened therebetween, and the member has a strongly adhesive face and a weakly adhesive face.

Furthermore, in the present invention, it is desirable that the weakly adhesive face has an adhesive force ranging from 1 to 100-gf/25 mm. Furthermore, in the present invention, it is desirable that the adhesive force of the strongly adhesive face be not less than 20 gf/25 mm greater than that of the weakly adhesive face. In addition, in the present invention, it is desirable that an acryl type adhesive agent and an epoxy type curing agent or an acryl type adhesive agent and an isocyanate type curing agent be contained. Furthermore, in the present invention, it is desirable that the refractive index be from 1.35 to 1.55. Furthermore, in the present invention, it is desirable that the shape be that of a sheet.

Furthermore, in the optical connecting structure of the present invention, an optical transmission medium and another optical transmission medium or an optical transmission medium and an optical part are optically connected by one of the above-mentioned adhesive connecting members.

In addition, the jig for attaching the adhesive connecting member of the present invention has a tabular member having an insertion hole corresponding to a size of an optical connector, and an adhesive connecting member cut to a predetermined size, in which the adhesive connecting member is arranged at a bottom of the insertion hole. Furthermore, in the present invention, it is desirable that a substrate board and a board having holes be unified by an adhesive layer to form the tabular member. In addition, in the present invention, it is desirable that the adhesive connecting member have a strongly adhesive layer and a weakly adhesive layer, and that the weakly adhesive layer be attached at the bottom of the insertion hole. Furthermore, in the present invention, it is desirable that the adhesive connecting member have a strongly adhesive layer and a weakly adhesive layer, and that the weakly adhesive layer be attached at the bottom of the insertion hole via a peel-off film. In addition, in the present invention, it is desirable that the weakly adhesive layer has an adhesive force ranging from 1 to 100 gf/25 mm. Furthermore, in the present invention, it is desirable that the adhesive force of the strongly adhesive layer and the weakly adhesive layer has a relationship shown by the following formula.

(Adhesive force of strongly adhesive layer)>(Adhesive force of weakly adhesive layer+20 gf/25 mm)

In addition, in the present invention, it is desirable that the insertion hole be covered with a protecting tape.

By means of the present invention, the adhesive connecting member and the optical connecting structure using the member in which connection loss can be reduced, aligning can be reattempted, and handling is facilitated, can be provided.

That is, the practical adhesive connecting member and the optical connecting structure using the member can be provided to enable easy performing of the optical connection with low connection loss.

Furthermore, by means of the present invention, the jig for attaching the adhesive connecting member in which the adhesive connecting member for reducing the connection loss can be easily attached at the tip of the optical fiber even in the field, is provided.

In addition, a practical jig for attaching the adhesive connecting member, in which carrying is convenient and workability is superior, can be provided.

BRIEF DESCRIPTION OF DRAWINGS

FIG. 4 is a diagram showing the jig for attaching the adhesive connecting member of the third embodiment of the present invention.

FIG. 6 is a diagram showing the jig for attaching the adhesive connecting member of the fourth embodiment of the present invention.

FIG. 7 is a magnified cross sectional view along A-A line showing the method for using the jig for attaching the adhesive connecting member.

BEST MODE FOR CARRYING OUT THE INVENTION

1. Adhesive Connecting Member (1) First Embodiment

The adhesive connecting member of the present invention optically connects an optical transmission medium such as an optical fiber or optical part (a) and another optical transmission medium or optical part (b) by being intervened therebetween, and the member has a strongly adhesive face and a weakly adhesive face.

The first embodiment is explained with reference to FIG. 1.

Figure 1:
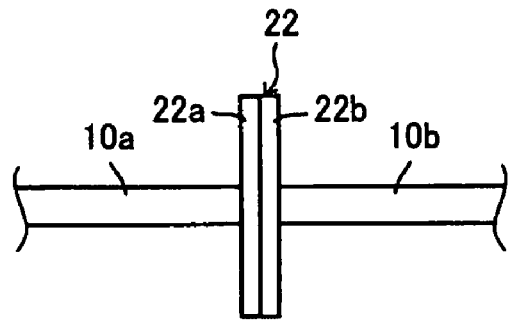
FIG. 1 is a side view showing the optical connecting structure of the first embodiment using the adhesive connecting member of the present invention.

FIG. 1 is a side view showing the optical connecting structure of the first embodiment in which the adhesive connecting member of the present invention is used.

Reference numerals 10a and 10b correspond to optical fibers, reference numeral 22 corresponds to a sheet-shaped adhesive connecting member, reference numeral 22a corresponds to a strongly adhesive face, and reference numeral 22b corresponds to a weakly adhesive face.

The sheet-shaped adhesive connecting member 22 has the strongly adhesive face 22a and the weakly adhesive face 22b. It is possible that the strongly adhesive face 22a and the weakly adhesive face 22b are formed unitarily, or alternatively, another refractive index matching agent may be placed between the strongly adhesive face 22a and the weakly adhesive face 22b.

In FIG. 1, the sheet-shaped adhesive connecting member 22 intervenes between the connecting end surfaces of the optical fibers 10a and 10b. The two optical fibers 10a and 10b face each other via the sheet-shaped adhesive connecting member 22, thereby optically connecting the optical fibers.

Here, the optical fiber 10a and the sheet-shaped adhesive connecting member 22 are strongly adhered.

The sheet-shaped adhesive connecting member 22 and the optical fiber 10b are extremely weakly adhered.

Therefore, when the optical fiber 10a and the optical fiber 10b are pulled, the sheet-shaped adhesive connecting member 22 and the optical fiber 10b are easily separated, and thus aligning can be easily reattempted.

It is necessary that the adhesive connecting member of the present invention have the strongly adhesive face 22a and the weakly adhesive face 22b in addition to having consistency of refractive indexes.

The consistency of refractive index in this case means relative similarity of the refractive index of the adhesive connecting member and the refractive index of at least one of the optical transmission medium and the optical part connected.

The refractive index of the adhesive connecting member of the present invention is not limited in particular as long as it is approximately the same as the refractive index of at least one of the optical transmission medium and the optical part, and from the viewpoint of transmission loss by avoidance of Fresnel reflection, it is desirable that the difference of these refractive indexes be within ±0.1, and it is particularly desirable that the difference be within ±0.05. It should be noted that it is desirable that the average value of the refractive indexes of the optical transmission medium and the optical part and the refractive index of the adhesive connecting member be within the above-mentioned range in the case in which the difference of the refractive index of the optical transmission medium and optical part is large.

As the adhesive connecting member used in the present invention, a sheet-shaped adhesive connecting member which is made into a film may be mentioned, and in addition, one which can freely change its shape, although it maintains a certain shape and does not flow in a static condition, may be mentioned.

Polymer materials such as various kinds of adhesive agent, for example, of the acryl type, epoxy type, vinyl type, silicone type, rubber type, urethane type, nylon type, bisphenol type, diol type, polyimide type, fluorinated epoxy type, fluorinated acryl type, can be used on the strongly adhesive face and the weak adhesive face. In addition, these can be mixed, or a fluorine resin or curing agent can be added, if necessary.

In particular among these, from the viewpoint of adhesive property and other viewpoints, the acryl type adhesive agent and the silicone type adhesive agent are desirably used.

The acryl type adhesive agent used in the present invention means a polymer in which the basic structure consists of an alkyl ester of carbon number 2 to 12 of an acrylic acid or alkyl ester of carbon number 4 to 12 of methacrylic acid as a main monomer. Practically, for example, alkyl esters of acrylic acid such as ethyl acrylate, n-butyl acrylate, iso-butyl acrylate, 2-ethylhexyl acrylate, lauryl acrylate, benzyl acrylate or the like, alkyl esters of methacrylic acid such as n-butyl methacrylate, iso-butyl methacrylate, 2-ethylhexyl methacrylate, lauryl methacrylate, benzyl methacrylate or the like may be mentioned. In addition, as a monomer which can be copolymerized with these main monomers, methyl acrylate, methyl methacrylate, ethyl methacrylate, propyl methacrylate, vinyl acetate, acrylonitrile, methacrylonitrile, acryl amide, styrene or the like may be mentioned.

The acryl type adhesive agent is required to have superior transparency, and it is desirable that the optical transmittance at a use wavelength, that is, visible light and near-infrared area, be not less than 85%. An acryl type adhesive agent can exhibit transparency relatively easily by controlling the cross-linking agent or curing agent. It is more desirable that the optical transmittance at a use wavelength be not less than 90%.

The silicone type adhesive agent used in the present invention means an adhesive agent in which the main chain skeleton consists of Si—O—Si bonding (siloxane bonding), and it consists of silicone rubber or silicone resin.

These may be dissolved with an organic solvent and coated thereon to solidify or form a film.

The main polymer of silicone rubber is polydimethylsiloxane having a straight chain, including one in which some of the methyl groups are substituted by a phenyl group or vinyl group.

In addition, a silicone resin having a complicated three-dimensional structure and a molecular weight from about 3000 to 10000 is used, and this functions as a resin for aiding adhesion, in a rubber type adhesive agent.

It should be noted that adhesive force and wettability can be controlled and water resistance and heat resistance can be added by adding an additive agent such as a cross-linking agent, flexibilizer, viscosity controlling agent or the like in the silicone type adhesive agent.

The silicone type adhesive agent has superior heat resistance retentivity, and it can exhibit superior adhesive force even in a high temperature and low temperature environment.

Therefore, in the optical connecting structure in which the silicone type adhesive agent is intervened between at least one of the optical transmission medium and the optical part, adhesion of the connecting part can be maintained, and thus reliable connecting conditions can be maintained at all times, even in a high temperature environment (more than 250° C.) and in low temperature environment (less than −50° C.).

In addition, it will not become hard and will not turn yellow even after exposure to high temperatures, and it can be efficiently peeled off from that to which it is adhered.

In addition, the silicone type adhesive agent has superior electrical insulation characteristics, chemical resistance, weather resistance and water resistance, and therefore it can be adhered to a wide range of materials, such as an optical fiber or the like, in which a cladding layer is coated with a fluorinated resin.

In addition, regarding an optical waveguide or an optical part, it can be effectively used since it exhibits adhesive property to fluorinated resin bases such as fluorinated polyimide.

As the curing agent, kinds of epoxy type curing agents, isocyanate type curing agents or the like can be used. In addition, hardening can be performed using a catalyst.

Both raw materials for the strongly adhesive face 22a and raw material for the weak adhesive face 22b can be prepared depending on a combination of adhesive agent and curing agent, and on the amount of addition.

In this case, the adhesive force of the weakly adhesive face is desirably 1 to 100 gf/25 mm, more desirably 5 to 50 gf/25 mm, and most desirably 10 to 30 gf/25 mm.

Connection will be unreliable if the adhesive force of the weakly adhesive face 22b is less than 1 gf/25 mm, and aligning would become difficult to reattempt if the adhesive force is more than 100 gf/25 mm.

The strongly adhesive face 22a is required to have a strongly adhesive force so that the adhesive connecting member will not peel off, and it is desirable that the adhesive force be not less than 20 gf/25 mm stronger than the adhesive force of the weakly adhesive face. Furthermore, it is more desirable that the adhesive force be not less than twice as strong as the adhesive force of the weakly adhesive face.

It should be noted that the above-mentioned adhesive force might be measured in conformity with "peel adhesion at 180 degrees" in JIS (Japanese Industrial Standard) Z0237.

It is desirable that the thickness of both the strongly and weakly adhesive faces be 10 to 30 μm. Furthermore, the thickness of the weakly adhesive face is desirably not more than 9 μm, and more desirably not more than 5 μm.

If the thickness of both the strongly and weakly adhesive faces is less than 10 μm, the connection cannot be performed well in the case in which at least one of an optical transmission medium and optical part has a convexo-concave portion. If the thickness were more than 30 μm, insertion loss would become larger.

In addition, if the thickness of the weakly adhesive face is more than 9 μm, it will become difficult to peel off from the optical transmission medium or the optical part. In addition, it is desirable that the difference of refractive index of the strongly adhesive face and weakly adhesive face is within ±0.03.

As an optical transmission medium used in the present invention, an optical waveguide can be mentioned in addition to the above-mentioned optical fiber, the kind is not limited in particular, and anything can be used as long as it can transmit light. In addition, the optical fiber is also not limited in particular, and it can be selected depending on its use. For example, an optical fiber consisting of quartz, plastics or the like can be used. In addition, as an optical waveguide, quartz optical waveguide, polyimide optical waveguide, PMMA optical waveguide, epoxy optical waveguide or the like can be used.

Furthermore, even if the kinds of two optical transmission mediums used are different, they can be adhered by wettability of the adhesive connecting member, and it is possible to connect reliably. In addition, even if the outer diameters of optical transmission mediums are different, the present invention can be employed as long as the core diameter and the mode field diameter are the same. It should be noted that the number of optical fibers and the number of optical waveguides are not limited in particular, and an optical fiber tape core wire having optical fibers can be used.

As an optical part used in the present invention, an optical lens and a filter can be mentioned, and the kinds thereof are not limited in particular. As an optical lens, for example, a lens of a type having shapes such as biconvex, biconcave, concavo-convex, plane convex, aspheric surface or the like, a collimated lens, and a rod lens can be mentioned. As a filter, a multilayer membrane filter, polyimide filter or the like can be mentioned in addition to generally used filters for optical communication.

(2) Second Embodiment

Next, the second embodiment is explained with reference to FIGS. 2 and 3.

FIG. 2 is a perspective view showing the optical connecting structure of the second embodiment using the adhesive connecting member of the present invention.

Reference numerals 11a to 14a and 11b to 14b correspond to optical fibers, reference numerals 15a and 15b correspond to an optical fiber tape core wire having four cores, reference numeral 47 corresponds to a guide pin, reference numerals 75a and 75b correspond to MT connectors, and reference numerals 751a and 751b correspond to insertion holes for guide pins.

In FIG. 2, the sheet-shaped adhesive connecting member 22 intervenes between the connection end surfaces of the MT connectors 75a and 75b.

Figure 2A:
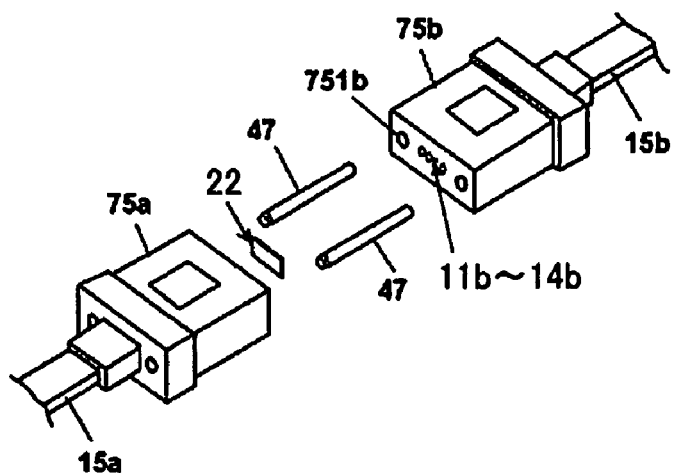
FIG. 2 is a perspective view showing the optical connecting structure of the second embodiment using the adhesive connecting member of the present invention.
Figure 2B:
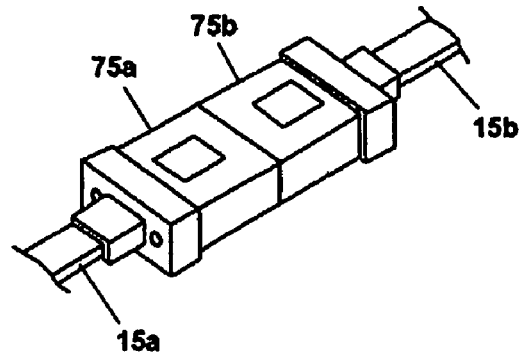

As shown in FIG. 2A, the two MT connectors 75a and 75b are aligned by the guide pin 47 and face each other via the sheet-shaped adhesive connecting member 22. Thus, the optical fibers are optically connected as shown in FIG. 2B.

Here, the MT connector 75a and the sheet-shaped adhesive connecting member 22 are strongly adhered.

The sheet-shaped adhesive connecting member 22 and the MT connector 75b are extremely weakly adhered.

Therefore, if the MT connectors 75a and 75b are pulled, the sheet-shaped adhesive connecting member 22 and the MT connector 75b are peeled apart, and thus, aligning can be reattempted easily.

FIG. 3 is a plane view showing the optical connecting structure of the second embodiment using the adhesive connecting member of the present invention.

Figure 3A:
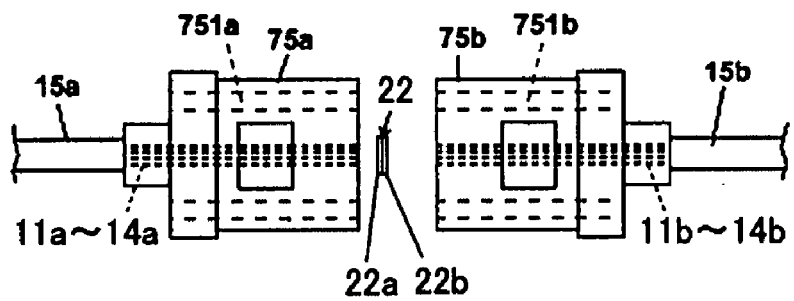
FIG. 3 is a plane view showing the optical connecting structure of the second embodiment using the adhesive connecting member of the present invention.

As shown in FIG. 3A, the sheet-shaped adhesive connecting member 22 is arranged between the MT connectors 75a and 75b.

Figure 3B:
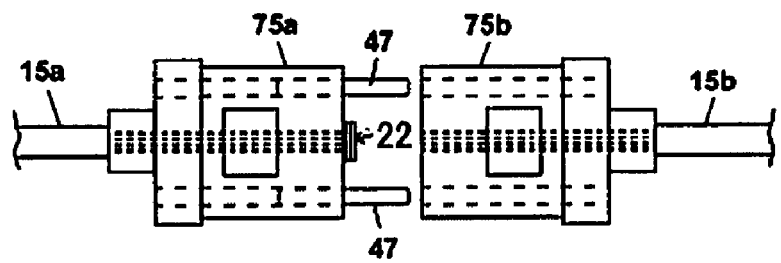

Next, as shown in FIG. 3B, the sheet-shaped adhesive connecting member 22 is adhered to the MT connector 75a. At this time, the strongly adhesive face 22a is contacted to the MT connector 75a.

Figure 3C:
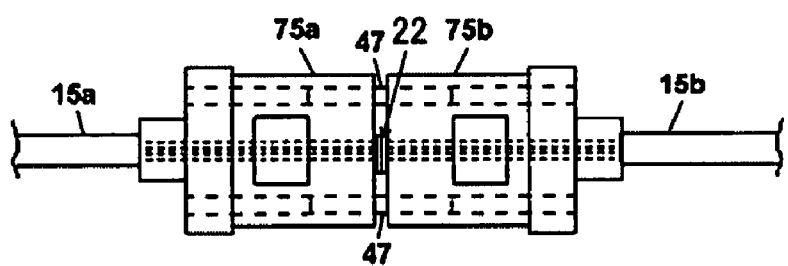

While aligning is performed by inserting the guide pin 47 into the insertion holes for guide pins 751a and 751b, as shown in FIG. 3C, the MT connectors 75a and 75b are faced to each other via the sheet-shaped adhesive connecting member 22. Thus, the weakly adhesive face 22b of the sheet-shaped adhesive connecting member 22 is adhered to the MT connector 75b, so as to prepare the optical connecting structure.

Since fine mismatching of contact angle often occurs even if the guide pin 47 for aligning is employed, appropriate connection can be facilitated by allowing reattempt of aligning by the present invention.

Next, the process for production of the adhesive connecting member of the present invention is explained.

A protecting film such as a PET film is placed, raw material for the weakly adhesive face and raw material for the strongly adhesive face are coated thereon, and a protecting film such as a PET film is placed thereon, so as to produce the adhesive connecting member.

In this case, the order of coating, that is, whether the raw material for the weakly adhesive face or the raw material for the strongly adhesive face is coated first, can be freely decided, and it is desirable that the weakly adhesive face desirably having the lesser thickness be coated first.

In addition, it is desirable that the next raw material be coated on the first one, which has not yet dried.

It should be noted that it is not always necessary to use the protecting film; however, it is desirable that the protecting film be used in production and be peeled off while being used, from the viewpoints of avoiding contamination and facilitating handling.

2. Optical Connecting Structure

Next, the process for production of the optical connecting structure of the present invention is explained.

The adhesive connecting member is cut to the required size, its strongly adhesive face is contacted with an optical transmission medium or optical part (a), and after that, its weakly adhesive face is contacted with another optical transmission medium or optical part (b), to prepare the optical connecting structure of the present invention. It should be noted that the order of contacting is not limited to this order.

Of course, in the case in which aligning has failed, the weakly adhesive face and another optical transmission medium or optical part (b) can be peeled apart by pulling the optical transmission medium or optical part (b), and reconnection can be performed easily.

3. Jig for Attaching the Adhesive Connecting Member

(1) Third Embodiment

The jig for attaching the adhesive connecting member of the third embodiment of the present invention is explained with reference to FIGS. 4 and 5.

Figure 4A:
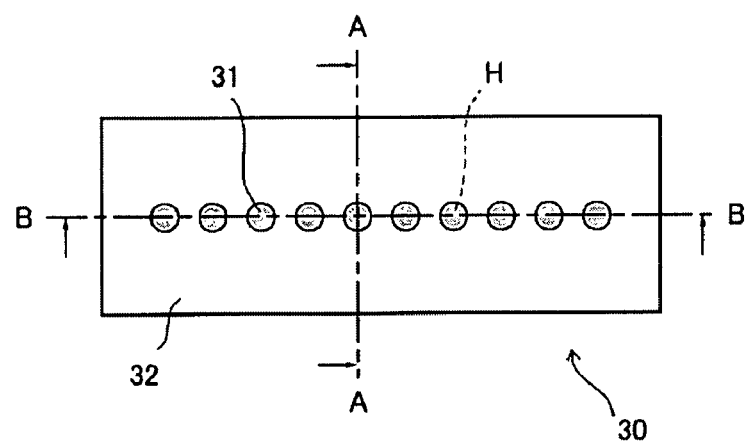
FIG. 4A is a plane view.
Figure 4B:
FIG. 4B is a cross sectional view along line B-B.
Figure 4C:
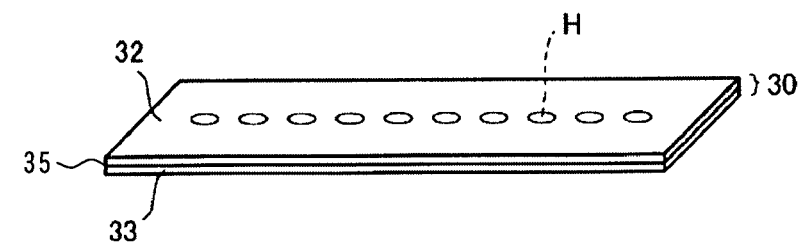
FIG. 4C is a perspective view.
Figure 5:
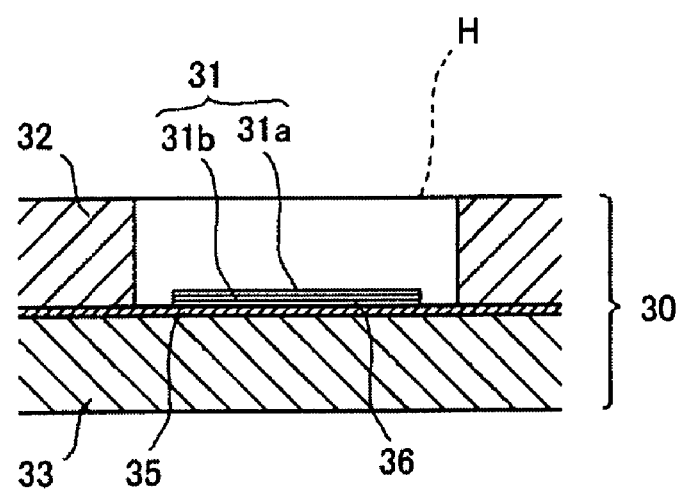
FIG. 5 is a magnified cross sectional view along line A-A of FIG. 4A.

FIG. 4 is a diagram showing the jig for attaching the adhesive connecting member of the third embodiment of the present invention, FIG. 4A is a plane view, FIG. 4B is a cross sectional view along the line B-B, FIG. 4C is a perspective view, and FIG. 5 is a magnified cross sectional view along the line A-A.

Reference numeral 30 corresponds to a tabular member which forms the jig for attaching the adhesive connecting member of the third embodiment, reference numeral 31 corresponds to an adhesive connecting member, reference numeral 31a corresponds to a strongly adhesive layer, reference numeral 31b corresponds to a weakly adhesive layer, reference numeral 32 corresponds to a board having holes which forms the tabular member, reference numeral 33 corresponds to a substrate board which forms the tabular member, reference numeral 35 corresponds to an adhesive layer which forms the tabular member, reference numeral 36 corresponds to a peel-off film, and H corresponds to an insert hole.

It should be noted that although the adhesive connecting member 31 is usually transparent, it is colored in the figure for clarity.

As shown in FIG. 4, the jig for attaching the adhesive connecting member of the third embodiment has the tabular member 30 having the insertion hole H corresponding to the optical connector size, and the adhesive connecting member 31 which is cut to a predetermined size, wherein the adhesive connecting member 31 is arranged on the bottom of the insertion hole H.

Tabular Member

The tabular member of the present invention may be a member that is of one piece; however, as shown in FIG. 5, it is desirable that it be formed by unifying the board having holes 32 and the substrate board 33 with the adhesive layer 35.

By means of this structure, the depth of the insertion hole H can be controlled by the thickness of the board having holes 32. In addition, it is not easy for the hole to be formed on a member that is of one piece and then for the adhesive connecting member 31 to be arranged at the bottom of the hole; however, by this structure, the adhesive connecting member 31 can be easily arranged at the bottom of the hole by arranging the adhesive connecting member 31 on the adhesive layer 35 and then placing the board having holes 32.

In addition, the adhesive connecting member 31 can be directly arranged on the adhesive layer 35, which is at the bottom of the insertion hole; however, it is desirable to arrange it via the peel-off film 36 as shown in FIG. 5.

The insertion hole H has a size corresponding to a size of an optical connector; however, a clearance to some extent can be arranged therearound.

Depth of the insertion hole H, that is, the thickness of the board having holes 32 in FIG. 5 desirably has a depth corresponding to the optical connector which is inserted, and practically, about 0.1 mm to 10 mm is desirable.

As a board having holes 32, an acrylic board, in which holes are formed precisely by using a laser or the like, is desirably used.

The insertion holes H are desirably formed regularly. Ten circular holes in one line are shown in FIG. 4; however, the number of lines or the number of holes can be increased, or insertion holes having mutually different sizes or shapes can be formed so that plural kinds of optical connectors can be inserted.

As an optical connector used in a jig for attaching the adhesive connecting member of the present invention, an SC connector, FC connector, MPO connector, MT connector, MU connector, FPC connector or the like can be mentioned.

For example a circular hole for an SC connector and a square hole for an MT connector can be formed on one tabular member at the same time.

The thickness of the substrate board 33 is not limited in particular, and 50 to 5000 μm is desirable.

PET (polyethylene terephthalate) or the like can be desirably used as the substrate board 33.

It is desirable that the thickness of the adhesive layer 35 be 100 to 200 μm.

It is desirable that the adhesive layer 35 has flexibility so that the optical connector can be pressed thereagainst, and a double-faced tape or the like is desirably used.

It is desirable that the thickness of the peel-off film 36 be 10 to 70 μm.

Peelable PET (polyethylene terephthalate) or the like is desirably used for the peel-off film 36.

Adhesive Connecting Member

It is necessary that the adhesive connecting member 31 used in the present invention have an adhesive property in addition to consistency of refractive index. In addition, as the adhesive connecting member 31, one in which both surfaces have similar adhesive force can be used; however, it is desirable to have both the strongly adhesive layer 31a and the weakly adhesive layer 31b as shown in FIG. 5. In addition, it is desirable that the weakly adhesive layer 31b be contacted to the bottom of the insertion hole H via the peel-off film 36.

The reason for this is that the strongly adhesive layer 31a strongly adheres on the tip of the optical connector when the optical connector is inserted into the insertion hole H, and at the same time the weakly adhesive layer 31b is easily peeled off from the bottom of the insertion hole, thereby realizing improvement of reliability and speed of work.

The strongly adhesive layer 31a and the weakly adhesive layer 31b can be formed so as to be unified, or alternatively, another refractive index matching agent may be disposed therebetween.

The consistency of the refractive index of the adhesive connecting member 31 means the similarity of the refractive index of the adhesive connecting member and the refractive index of at least one of the optical transmission medium and the optical part connected.

The refractive index of the adhesive connecting member of the present invention is not limited in particular as long as it is approximately the same as the refractive index of at least one of the optical transmission medium and the optical part, and from the viewpoint of transmission loss by avoidance of Fresnel reflection, it is desirable that the difference of these refractive indexes be within ±0.1, and it is particularly desirable that the difference be within ±0.05. It should be noted that it is desirable that the average value of the refractive indexes of the optical transmission medium and the optical part and the refractive index of the adhesive connecting member be within the above-mentioned range in the case in which the difference of the refractive index of the optical transmission medium and the optical part is large.

Polymer materials, such as various kinds of adhesive agent, for example, of the acryl type, epoxy type, vinyl type, silicone type, rubber type, urethane type, methacryl type, nylon type, bisphenol type, diol type, polyimide type, fluorinated epoxy type, and fluorinated acryl type, can be used on the strongly adhesive layer 31a and the weakly adhesive layer 31b. In addition, these can be mixed, or a fluorine resin or a curing agent can be added, if necessary.

In particular, among these, from the viewpoints of the adhesive property and other viewpoints, an acryl type adhesive agent and silicone type adhesive agent are desirably used.

Both the raw material for the strongly adhesive layer 31a and the raw material for the weakly adhesive layer 31b can be prepared depending on the combination of the adhesive agent and the curing agent, and on the amount of addition.

At this time, the adhesive force of the weakly adhesive layer is desirably 1 to 100 gf/25 mm, more desirably 5 to 50 gf/25 mm, and most desirably 10 to 30 gf/25 mm.

Connection would be unreliable if the adhesive force of the weakly adhesive layer 31b were less than 1 gf/25 mm, and aligning would become difficult to reattempt if the adhesive force were more than 100 gf/25 mm.

The strongly adhesive layer 31a is required to have a strongly adhesive force so that the adhesive connecting member will not peel off, and it is desirable that the adhesive force be not less than 20 gf/25 mm stronger than the adhesive force of the weakly adhesive layer. That is, the following relationship should exist.

(Adhesive force of strongly adhesive layer)>(Adhesive force of weakly adhesive layer+20 gf/25 mm)

Furthermore, it is more desirable that the adhesive force be not less than twice as strong as the adhesive force of the weakly adhesive layer.

It should be noted that the above-mentioned adhesive force could be measured in conformity with "peel adhesion of 180 degrees" according to the JIS (Japanese Industrial Standard) Z0237.

It is desirable that the thickness of both the strongly and weakly adhesive layers 31a and 31b be 10 to 30 μm. Furthermore, the thickness of the weakly adhesive layer 31b is desirably not more than 9 μm, and more desirably, not more than 5 μm.

It is desirable that the adhesive connecting member 31 have a size narrower to some extent than the insertion hole H corresponding to a size of the optical connector, and it is desirable to arrange it at the center of the insertion hole H.

(2) Fourth Embodiment

Next, the jig for attaching the adhesive connecting member of the fourth embodiment of the present invention is explained with reference to FIG. 6.

Figure 6A:
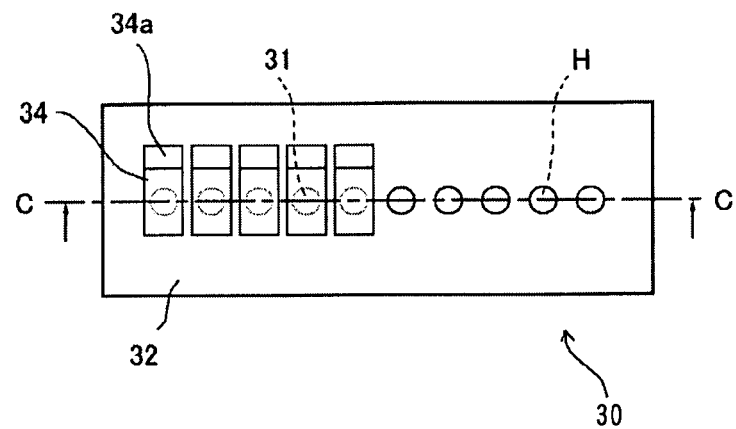
FIG. 6A is a plane view.
Figure 6B:
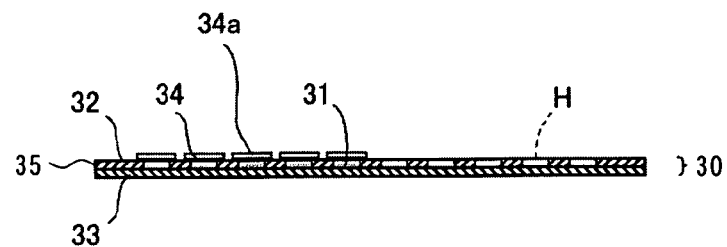
FIG. 6B is a cross sectional view along line C-C.
Figure 6C:
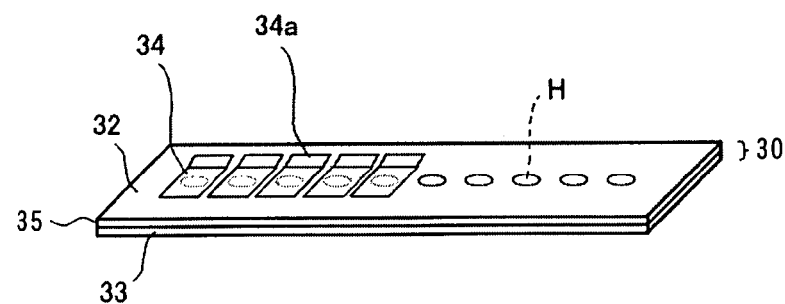
FIG. 6C is a perspective view.

FIG. 6 is a diagram showing the jig for attaching the adhesive connecting member of the fourth embodiment of the present invention, FIG. 6A is a plane view, FIG. 6B is a cross sectional view along the line C-C, and FIG. 6C is a perspective view.

Reference numeral 34 corresponds to a protecting tape, and reference numeral 34a corresponds to a grip part of the protecting tape.

The jig for attaching the adhesive connecting member of the fourth embodiment of the present invention is similar to the jig for attaching the adhesive connecting member of the third embodiment of the present invention, except that the insertion holes H are covered with the protecting tape 34.

As protecting tape 34, a commercially available mending tape or the like is desirably used.

By means of the protecting tape 34, dust or the like can be prevented from entering into the insertion holes H before use.

In addition, as shown in FIG. 6, by peeling and discarding the protecting tape 34 in the course of use, which insertion holes H have been used can be easily determined by noting whether or not the protecting tape 34 is present on a hole.

It should be noted that handling can be facilitated and workability improved by arranging grip part 34 by bending the end of the mending tape.

(3) Process for Production of the Jig for Attaching the Adhesive Connecting Member Next, the process for production of the jig for attaching the adhesive connecting member of the present invention is explained.

First, a double-faced tape or the like, which has an adhesive layer 35, is adhered on the substrate board 33, and peel-off PET or the like is arranged thereon as a peel-off film 36.

Next, the raw material of the weak adhesive layer 31b and the raw material of the strongly adhesive layer 31a are coated on the peel-off PET 36 and are then dried.

Next, the weakly adhesive layer 31b, strongly adhesive layer 31a, and peel-off PET 36 of predetermined area is cut so that the area is narrower to some extent than the size of the optical connector, and the weakly adhesive layer 31b, strongly adhesive layer 31a, and peel-off PET 36 of the other area is removed.

In addition, by placing the board having holes 32 in which holes are formed precisely by a laser or the like, on the double-faced tape 35, the jig for attaching the adhesive connecting member of the third embodiment can be prepared.

Furthermore, by adhering the protecting tape 34 so as to cover the insertion holes H, the jig for attaching the adhesive connecting member of the fourth embodiment of the invention can be prepared.

(4) Method of Using the Jig for Attaching the Adhesive Connecting Member

Next, the method of using the jig for attaching the adhesive connecting member of the present invention is explained with reference to FIG. 7.

Figure 7A:
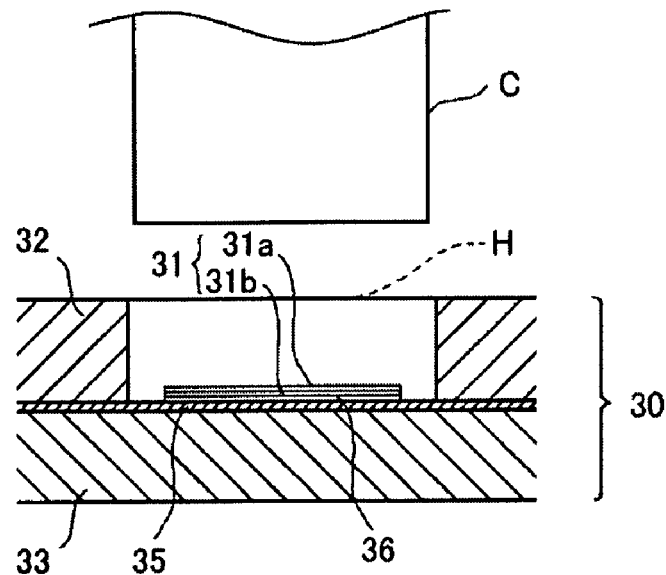
FIG. 7A is a diagram showing before the insertion of the optical connector.
Figure 7B:
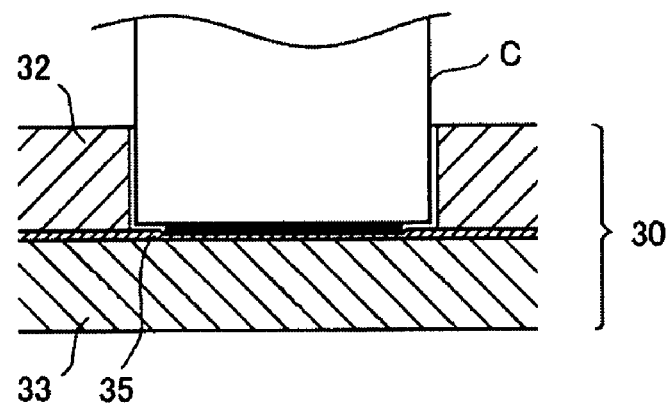
FIG. 7B is a diagram showing the insertion of the optical connector.
Figure 7C:
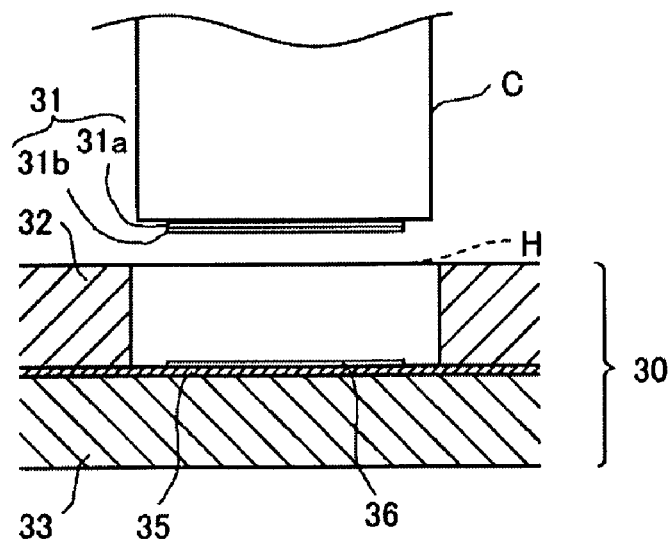
FIG. 7C is a diagram showing after the optical connector has been inserted.
Figure 8:
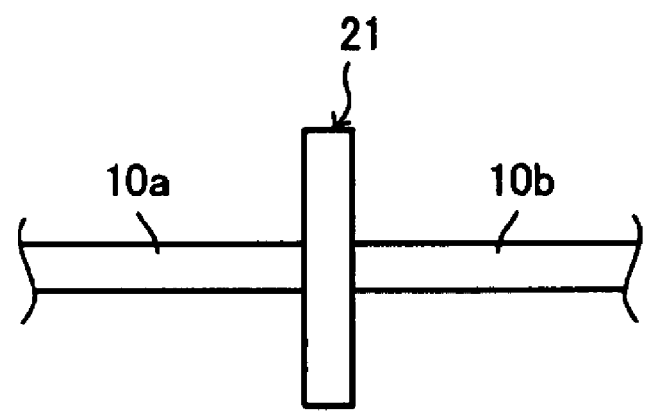
FIG. 8 is a side view showing a concept of the optical connecting structure using a conventional adhesive connecting member.

FIG. 7 is a magnified cross sectional view along line A-A showing the method of using the jig for attaching the adhesive connecting member, FIG. 7A is a diagram showing the optical connector before it is inserted, FIG. 7B is a diagram showing the optical connector being inserted, and FIG. 7C is a diagram showing the optical connector after insertion.

As shown in FIG. 7A, in the jig for attaching the adhesive connecting member before inserting the optical connector C, the adhesive connecting member 31 is arranged via the peel-off film 36 at the bottom of the insertion hole H.

As shown in FIG. 7B, during insertion of the optical connector C, the strongly adhesive layer 31a is adhered on the optical connector C, the adhesive layer 35 having further flexibility functions as a cushion, and the entire surface of the adhesive connecting member 31 is adhered completely with no gap to the tip of the optical connector C.

As shown in FIG. 7C, after inserting the optical connector C, the weak adhesive layer 31b is peeled off from the peel-off film 36 and the adhesive connecting member 31 is transferred to the tip of the optical connector C.

It should be noted that the optical connecting structure can be easily prepared by pressing the above-mentioned optical connector C against another optical connector or optical part. In that case, even if the optical connectors are adhered in a mismatched manner, reconnection can be performed since another optical connector and the weakly adhesive layer 31b can be easily peeled apart.

EXAMPLES

Next, the optical connecting structure and the jig for attaching the adhesive connecting member of the present invention are explained with reference to Examples.

1. Optical Connecting Structure

Example 1

First, the adhesive connecting structure was prepared.

As a raw material for the strongly adhesive face, raw material A was prepared.

Raw Material A 100 parts by weight of acryl type adhesive agent α+0.05 parts by weight of epoxy type curing agent, adhesive force: 1767 gf/25 mm, refractive index at 20° C.: 1.463

It should be noted that the refractive index was measured by using a light source having a wavelength of 1310 nm (hereinafter, the same).

As a raw material for the weakly adhesive face, raw material X was prepared.

Raw Material X 100 parts by weight of acryl type adhesive agent α+4 parts by weight of epoxy type curing agent, adhesive force: 30 gf/25 mm, refractive index at 20° C.: 1.468

A PET film having a thickness of 50 μm was placed, and the raw material X was coated thereon to have a thickness of 5 μm.

Immediately after that, the raw material A was coated thereon to have thickness of 15 μm, and a PET film having a thickness of 50 μm was placed thereon to prepare the adhesive connecting member of Example 1.

Next, the optical connecting structure was prepared.

First, the adhesive connecting member was cut to a necessary size, and an end part of an MT connector in which eight quartz-type single mode optical fibers (produced by Sumitomo Electric Industries, Ltd., outer diameter: 0.25 mm, refractive index at 20° C.: 1.452) were bundled and were adhered to the strongly adhesive face of the adhesive connecting member. Next, this MT connector was made to face another MT connector in which eight quartz type single mode optical fibers (produced by Sumitomo Electric Industries, Ltd., outer diameter: 0.25 mm, refractive index at 20° C.: 1.452) were bundled to connect with the weakly adhesive face of an adhesive connecting member, and thus the optical connecting structure of Example 1 was prepared.

Example 2

The adhesive connecting member and optical connecting structure of Example 2 were prepared in a manner similar to that of Example 1, except that raw material B was used instead of the raw material A as a material for the strongly adhesive face.

Raw Material B 100 parts by weight of acryl type adhesive agent β+0.9 parts by weight of epoxy type curing agent (tolylenediisocyanate-trimethylolpropane adduct), adhesive force: 148 gf/25 mm, refractive index at 20° C.: 1.464.

Example 3

The adhesive connecting member and optical connecting structure of Example 3 were prepared in a manner similar to that of Example 1, except that raw material C was used instead of the raw material A as a material of the strongly adhesive face.

Raw Material C 86 parts by weight of acryl type adhesive agent β+14 parts by weight of fluorine resin+0.77 parts by weight of isocyanate curing agent (tolylenediisocyanate-trimethylolpropane adduct), adhesive force: 182 gf/25 mm, refractive index at 20° C.: 1.457.

Example 4

The adhesive connecting member and optical connecting structure of Example 4 were prepared in a manner similar to that of Example 1, except that raw material Y was used instead of the raw material X as a material of the weakly adhesive face.

Raw Material Y 100 parts by weight of acryl type adhesive agent y+1 part by weight of isocyanate curing agent (diisocyanate hexamethylene adduct), adhesive force: 10 gf/25 mm, refractive index at 20° C.: 1.478.

Comparative Example 1

The adhesive connecting member and optical connecting structure of Comparative Example 1 were prepared by using only the raw material A.

Comparative Example 2

The adhesive connecting member and optical connecting structure of Comparative Example 2 were prepared by using only the raw material B.

Comparative Example 3

The adhesive connecting member and optical connecting structure of Comparative Example 3 were prepared by using only the raw material C.

Comparative Example 4

The adhesive connecting member and optical connecting structure of Comparative Example 4 were prepared by using only the raw material X.

Comparative Example 5

The adhesive connecting member and optical connecting structure of Comparative Example 5 were prepared by using only the raw material Y.

The raw materials used to prepare each Example and Comparative Example are shown in Table 1.

TABLE 1

|  | Strongly Adhesive Face | Weakly Adhesive Face |
| --- | --- | --- |
| Example 1 | Raw Material A | Raw Material X |
| Example 2 | Raw Material B | Raw Material X |
| Example 3 | Raw Material C | Raw Material X |
| Example 4 | Raw Material A | Raw Material Y |
| Comparative Example 1 | Raw Material A | |
| Comparative Example 2 | Raw Material B | |
| Comparative Example 3 | Raw Material C | |
| Comparative Example 4 | Raw Material X | |
| Comparative Example 5 | Raw Material Y | |

The optical connecting structure of the Examples and Comparative Examples were evaluated by the following methods.

Method of Evaluation

Initial Connection Loss

The connecting surface of an MT connector in which eight optical fibers were bundled was ground, and the MT connector and another MT connector were directly connected. Light of 1550 nm from an LED was applied at one end of each of eight optical fibers, and the power of the transmitted light at the other end was measured, and the average value was calculated as a standard value.

Next, light of 1550 nm from an LED was applied at one end of each of eight optical fibers of the optical connecting structures of the Examples and Comparative Examples, and the power of transmitted light at the other end was measured, and the average value was calculated from each initial value.

Differences between the standard value and the initial value are calculated as an initial connection loss [dB].

Number Of Times Reconnection Successful

Light of 1550 nm from an LED was applied at one end of each of eight optical fibers of the optical connecting structure of Examples and Comparative Examples, and the power of transmitted light at the other end was measured, and the average value was calculated as an each initial value.

Next, the weak adhesive face and the other MT connector were peeled apart by pulling the MT connector, and the MT connector was reconnected with the other MT connector by facing them to each other. The power of transmitted light was measured in a similar manner, and the difference from the initial value [dB] was measured.

A difference within 0.3 dB was regarded as a successful reconnection.

The peeling, reconnection and measuring were repeated until the difference from the initial value became more than 0.3 dB or until the number of times of measuring reached 100 times, and thus the number of times reconnection was successful was measured.

The results are shown in Table 2.

TABLE 2

|  | Initial Connection Loss [dB] | Number of Times Reconnection Successful |
| --- | --- | --- |
| Example 1 | 0.018 | Not less than 100 times |
| Example 2 | 0.074 | Not less than 100 times |
| Example 3 | 0.038 | Not less than 100 times |
| Example 4 | 0.063 | Not less than 100 times |
| Comparative Example 1 | 0.090 | 0 times |
| Comparative Example 2 | 0.098 | 1 time |

TABLE 2-continued

|  | Initial Connection Loss [dB] | Number of Times Reconnection Successful |
| --- | --- | --- |
| Comparative Example 3 | 0.111 | 0 times |
| Comparative Example 4 |  | Adhering was impossible (Measuring was impossible) |
| Comparative Example 5 |  | Adhering was impossible (Measuring was impossible) |

Results of Evaluation

In Examples 1 to 4, there was no problem in practical use both in the initial connection loss and in the number of times reconnection was successful.

On the other hand, in Comparative Examples 1 to 3, although there was no problem in practical use in the initial connection loss, there was a problem in practical use in the number of times reconnection could be successfully performed, since the number of times was not more than once.

Furthermore, in Comparative Examples 4 and 5, the adhesive force was too weak and the MT connector could not hold the adhesive connecting member. Since adhering was impossible, both the initial connection loss and the number of times reconnection was successful could not be measured.

2. Jig for Attaching the Adhesive Connecting Member

Example 5

First, as a raw material for the strongly adhesive layer, raw material A was prepared.

Raw Material A 100 parts by weight of acryl type adhesive agent+0.05 parts by weight of an epoxy type curing agent, adhesive force: 1767 gf/25 mm, refractive index at 20° C.: 1.463.

It should be noted that the refractive index was measured by using a light source having a wavelength of 1310 nm (hereinafter, the same).

As a raw material for the weakly adhesive layer, raw material X was prepared.

Raw Material X 100 parts by weight of an acryl type adhesive agent+4 parts by weight of an epoxy type curing agent, adhesive force: 30 gf/25 mm, refractive index at 20° C.: 1.468.

Next, a double-faced tape (produced by Nitto Denko Corporation, trade name: Double-faced adhesive tape, thickness: 125 μm) which has an adhesive layer 35 was adhered on a transparent PET board (produced by Acrysunday Co., Ltd, trade name: Sunday PET, thickness: 500 μm) which is a substrate board 33, and a commercially available peel-off PET (thickness: 38 μm) as a peel-off film 36 was arranged thereon.

Next, the raw material X of the weakly adhesive layer 31b and the raw material A of the strongly adhesive layer 31a were coated on the peel-off PET and were dried.

It should be noted that the thickness of the weakly adhesive layer 31b was 5 μm and the thickness of the strongly adhesive layer 31a was 15 μm.

Next, the weakly adhesive layer 31b, strongly adhesive layer 31a, and peel-off PET 36 of ten predetermined areas were cut by a laser so that the areas had circular shapes and diameters of 2 mm, and the weakly adhesive layer 31b, strongly adhesive layer 31a, and peel-off PET 36 of the other areas was removed by peeling.

Next, the board having holes 32 (produced by Acrysunday Co., Ltd, trade name: Acryl Sunday plate, thickness: 1 mm) in which ten holes, each having a diameter of 2.5 mm, were made precisely by a laser beforehand, was aligned and placed on the double-faced tape.

Furthermore, a mending tape (produced by Sumitomo 3M, trade name: Scotch mending tape), which is a protecting tape 34, was adhered so as to cover the insertion holes H, to prepare the jig for attaching the adhesive connecting member of Example 5.

Next, using the jig for attaching the adhesive connecting member of Example 5, the adhesive connecting member was adhered on ten SC connectors (produced by Sumitomo Electric Industries, Ltd., trade name: Pigtail fiber with SC connector on one end), and they were pressed to other SC connectors (produced by Sumitomo Electric Industries, Ltd., trade name: Pigtail fiber with SC connector on one end) by using a connector adaptor, to prepare the optical connecting structure. The time required for preparing was measured.

The time taken for preparing the ten optical connecting structures was 70 seconds.

In addition, there was no problem in practical use in connection of the ten optical connecting structures.

Comparative Example 6

A PET film having a thickness of 50 μm was placed, and the raw material X was coated thereon so as to have a thickness of 5 μm.

Next, the raw material A was coated thereon immediately so as to have a thickness of 15 μm and was dried to prepare the adhesive connecting member of Comparative Example 6.

Next, adhesive connecting members having the required size were cut from the adhesive connecting member of Comparative Example 6, were adhered on ten SC connectors (produced by Sumitomo Electric Industries, Ltd, trade name: Pigtail fiber with SC connector on one end), and were pressed to other SC connectors (produced by Sumitomo Electric Industries, Ltd., trade name: Pigtail fiber with SC connector on one end) by using a connector adaptor, to prepare the optical connecting structures. The time required for preparing was measured.

The time taken for preparing the ten optical connecting structures was 3000 seconds (50 minutes).

In addition, there were problems in practice since in three optical connecting structures among the ten optical connecting structures, aligning failed.

Results of Evaluation

As explained above, by means of the present invention, the jig for attaching the adhesive connecting member, in which the adhesive connecting member, which reduces connection loss, can be easily adhered onto the tip of the optical fiber, even in the field, can be provided.

In addition, a practical jig for attaching the adhesive connecting member, which is easy to carry because of its tabular shape and which has superior workability, can be provided.

What is claimed is:

1. A jig for attaching an adhesive connecting member comprising:
   a tabular member having insertion hole(s) corresponding to a size of an optical connector; and
   (an) adhesive connecting member(s) cut to a predetermined size, wherein the adhesive connecting member is arranged at a bottom of an insertion hole, and has a first adhesive layer and a second adhesive layer, wherein the first adhesive layer has a weaker adhesive force relative to the second adhesive layer, and wherein the first adhesive layer is contacted at the bottom of the insertion hole.

2. The jig for attaching the adhesive connecting member according to claim 1, wherein a substrate board and a board having holes are unified by an adhesive layer to form the tabular member.

3. The jig for attaching the adhesive connecting member according to claim 1, wherein the first adhesive layer is contacted to a peel-off film and the peel off film is contacted at the bottom of the insertion hole.

4. The jig for attaching the adhesive connecting member according to claim 1, wherein the first adhesive layer has an adhesive force in a range of 1 to 100 gf/25 mm.

5. The jig for attaching the adhesive connecting member according to claim 1, wherein adhesive forces of the second adhesive layer and first adhesive layer have the relationship:

Adhesive force of second adhesive layer>Adhesive force of first adhesive layer+20 gf/25 mm.

6. The jig for attaching the adhesive connecting member according to claim 1, wherein the insertion hole is covered with a protecting tape.

\* \* \* \* \*